(12) United States Patent
Vasten

(10) Patent No.: US 8,781,962 B2
(45) Date of Patent: Jul. 15, 2014

(54) SYSTEM AND METHOD FOR PROVIDING ALTERNATE FUNDING SOURCE FOR PORTABLE CONSUMER DEVICE

(75) Inventor: Brett Vasten, Highlands Ranch, CO (US)

(73) Assignee: Visa International Service Association, San Francisco, CA (US)

( * ) Notice: Subject to any disclaimer, the term of this patent is extended or adjusted under 35 U.S.C. 154(b) by 224 days.

(21) Appl. No.: 12/717,792

(22) Filed: Mar. 4, 2010

(65) Prior Publication Data

US 2011/0055081 A1    Mar. 3, 2011

Related U.S. Application Data

(60) Provisional application No. 61/239,363, filed on Sep. 2, 2009.

(51) Int. Cl.
*G06Q 40/00* (2012.01)
(52) U.S. Cl.
USPC .......................................................... 705/41
(58) Field of Classification Search
CPC .................................................. G06Q 20/105
USPC .......................................................... 705/41
See application file for complete search history.

(56) References Cited

U.S. PATENT DOCUMENTS

| | | |
|---|---|---|
| 5,477,038 A | 12/1995 | Levine et al. |
| 5,864,830 A | 1/1999 | Armetta et al. |
| 5,917,965 A | 6/1999 | Cahill et al. |
| 5,946,669 A | 8/1999 | Polk |
| 5,953,710 A | 9/1999 | Fleming |
| RE36,365 E | 11/1999 | Levine et al. |
| 5,984,180 A | 11/1999 | Albrecht |
| 6,021,943 A | 2/2000 | Chastain |
| 6,044,360 A | 3/2000 | Picciallo |
| 6,105,009 A | 8/2000 | Cuervo |
| 6,119,107 A | 9/2000 | Polk |
| RE37,122 E | 4/2001 | Levine et al. |
| 6,422,462 B1 | 7/2002 | Cohen |
| 6,473,500 B1 | 10/2002 | Risafi et al. |

(Continued)

FOREIGN PATENT DOCUMENTS

| KR | 10-2001-0044264 A | 6/2001 |
|---|---|---|
| KR | 10-2003-006736 A | 8/2003 |

(Continued)

OTHER PUBLICATIONS

International Search Report and Written Opinion mailed Apr. 14, 2011 in PCT/US2010/047709, filed Sep. 2, 2010, 10pp.

*Primary Examiner* — Lindsay M. Maguire
(74) *Attorney, Agent, or Firm* — Kilpatrick Townsend & Stockton LLP

(57) ABSTRACT

A system, apparatus, and method for providing a mechanism for loading a prepaid card, such as a payroll card, with funds from a source other than the employer of the cardholder. The invention permits a cardholder to request that their employer provided payroll card (or other form of prepaid card) be charged or loaded with funds from an alternate source of funding. In response to the request, one or more background, credit, or other forms of security checks or investigations may be performed to ensure that accurate data regarding the cardholder is available and that there are no indications that the request might be an attempt to commit a fraudulent act.

22 Claims, 5 Drawing Sheets

(56) References Cited

U.S. PATENT DOCUMENTS

| | | |
|---|---|---|
| 6,502,745 B1 | 1/2003 | Stimson et al. |
| RE38,255 E | 9/2003 | Levine et al. |
| 6,615,189 B1 | 9/2003 | Phillips et al. |
| 6,615,190 B1 | 9/2003 | Slater |
| 6,892,187 B2 | 5/2005 | Phillips et al. |
| 6,999,569 B2 | 2/2006 | Risafi et al. |
| 7,054,838 B2 | 5/2006 | Sutton et al. |
| 7,130,828 B2 | 10/2006 | Phillips et al. |
| 7,162,049 B2 * | 1/2007 | Polk, Jr. .................. 381/345 |
| 7,165,049 B2 | 1/2007 | Slater |
| 7,171,388 B2 | 1/2007 | Phillips et al. |
| 7,174,314 B2 | 2/2007 | Phillips et al. |
| 7,174,315 B2 | 2/2007 | Phillips et al. |
| 7,174,316 B2 | 2/2007 | Phillips et al. |
| 7,174,317 B2 | 2/2007 | Phillips et al. |
| 7,225,155 B1 | 5/2007 | Polk |
| 7,252,226 B2 | 8/2007 | Risafi et al. |
| 7,317,823 B1 | 1/2008 | Price et al. |
| 7,363,273 B2 | 4/2008 | Phillips et al. |
| 7,809,642 B1 | 10/2010 | Phillips et al. |
| 7,886,969 B2 | 2/2011 | Antoo et al. |
| 2001/0034676 A1* | 10/2001 | Vasic ........................ 705/30 |
| 2001/0047342 A1 | 11/2001 | Cuervo |
| 2003/0033246 A1* | 2/2003 | Slater ........................ 705/39 |
| 2003/0055782 A1* | 3/2003 | Slater ........................ 705/39 |
| 2004/0111361 A1* | 6/2004 | Griffiths et al. ............ 705/39 |
| 2005/0127168 A1 | 6/2005 | Phillips et al. |
| 2006/0100927 A1 | 5/2006 | Zormati |
| 2007/0125842 A1* | 6/2007 | Antoo et al. ............. 235/380 |
| 2008/0301019 A1* | 12/2008 | Monk ........................ 705/35 |

FOREIGN PATENT DOCUMENTS

| | | |
|---|---|---|
| KR | 10-2004-0028447 A | 4/2004 |
| KR | 10-2008-0047074 A | 5/2008 |
| WO | WO 2011/028923 | 3/2011 |

\* cited by examiner

US 8,781,962 B2

SYSTEM AND METHOD FOR PROVIDING ALTERNATE FUNDING SOURCE FOR PORTABLE CONSUMER DEVICE

CROSS-REFERENCE TO RELATED APPLICATION

This application claims priority from U.S. Provisional Patent Application No. 61/239,363, filed Sep. 2, 2009, the contents of which are incorporated herein by reference in their entirety for all purposes.

BACKGROUND

Embodiments of the present invention are directed to systems, apparatuses and methods for using prepaid cards or other portable consumer payment devices to make payments for goods or services, and more specifically, to a method of providing funds to recharge or load a prepaid card, payroll card, token, or other consumer payment device. Embodiments of the invention allow a consumer to use a source other than their employer (or if the payment device was not issued by their employer, other than the original issuer of the card or payment device) to provide funds that may be accessed using the card, token, or other form of payment device. Embodiments of the invention may be used to provide a mechanism for the funding of a prepaid card, payroll card, or other form of payment device (or account associated with a consumer payment device) using a variety of alternate sources, including, but not limited to, a card loading network, money transfers, a cardholders checking account, etc.

A popular form of consumer payment device is a prepaid card or similar device that is "loaded" with a predetermined amount of money or linked to an account with a predetermined amount of money. The money may be used to provide payment for goods or services by presenting the card or payment device to a merchant. A typical form of prepaid card is a payroll card issued by an employer to an employee. In some cases, the employee may not have access to other banking services, and may use the card to pay for goods or services. Even if the employee does have access to banking services, the card provides a convenient way for an employer to provide salary or benefits payments to an employee. In the case of a payroll card, the card is typically loaded by the employer with funds based on the employee's paycheck or benefits. In such a situation, the payroll card functions in a similar manner to a debit card that is loaded with an amount of money corresponding to the employee's paycheck or benefits.

However, an employee may wish to provide other sources of funds for loading or for adding to the available balance of a prepaid card, payroll card, or other form of portable consumer payment device. For example, an employee may wish for a third party to be able to provide funds that can be accessed using the prepaid or payroll card. The employee may also wish to be able to transfer funds from another of the employee's accounts (such as a checking, savings, or credit card account) to the prepaid or payroll card. These are examples of ways in which the ability to reload a portable consumer payment device with funding from other sources would provide an employee with access to additional funds beyond those provided by an employer. Unfortunately, at present this capability is not provided by employers or issuers of prepaid cards (or other forms of consumer payment devices). One reason why such a capability is not presently provided is that there is no process or mechanism in place to reduce the risk of fraud in the use of alternate sources of funding.

What is desired are a system, apparatuses and methods for providing a consumer with the ability to charge or load a prepaid card, such as a payroll card, or another form of consumer payment device with money from a source of funding other than an employer. It is also desired to provide a card issuer, payment device issuer, or payment processor with a method of enabling use of such alternate funding sources that does not expose the issuer or payment processor to fraudulent attempts to utilize the alternate sources of funding. Embodiments of the invention address these problems and other problems individually and collectively.

SUMMARY

Embodiments of the present invention are directed to a system, apparatuses, and methods for providing a mechanism for loading a prepaid card, such as a payroll card, with funds from a source other than the employer of the cardholder. The invention permits a consumer or cardholder to request that their employer provided payroll card (or other form of prepaid card) be charged or loaded with funds from an alternate source of funding (i.e., a source of funding other than the employer or the entity that originally provided funds to the device). In response to the request, one or more background, credit, or other forms of security checks or investigations are performed to determine if there are any unresolved fraud cases involving the cardholder, to ensure that accurate data regarding the cardholder is available, and that there are no indications that the request might be an attempt to commit a fraudulent act. Although some embodiments of the invention will be described with reference to a cardholder and the use of the invention to provide an alternate source of funding for a prepaid or payroll card, it should be understood that the invention may be used by a consumer with any suitable consumer payment device. Such consumer payment devices include prepaid cards, payroll cards, a token that operates as a payment device, a contact or contactless chip incorporated in a card form factor or into a device such as a mobile phone, personal digital assistant or laptop computer, etc.

In one embodiment, the present invention is directed to an apparatus for enabling a consumer to load funds to a consumer payment device, where the apparatus includes an electronic processor programmed to execute a set of instructions, a data storage device coupled to the processor, and the set of instructions contained in the data storage device, wherein when the set of instructions are executed by the processor, the apparatus enables the consumer to load funds to the consumer payment device by:

receiving a request for the consumer to be able to provide funds to the consumer payment device from an alternate source of funding;

accessing consumer profile data and account data for the consumer payment device in response to receiving the request;

determining if there is an open fraud case associated with the consumer or with the consumer payment device;

denying the consumers request if there is an open fraud case associated with the consumer or with the consumer payment device; and performing one or more fraud or security checks using the consumer profile data and account data if there is not an open fraud case associated with the consumer or with the consumer payment device.

In another embodiment, the present invention is directed to a method for enabling a consumer to load funds to a consumer payment device, where the method includes receiving a request for the consumer to be able to provide funds to the consumer payment device from an alternate source of funding, accessing consumer profile data and account data for the consumer payment device in response to receiving the request, determining if there is an open fraud case associated with the consumer or with the consumer payment device, denying the consumers request if there is an open fraud case associated with the consumer or with the consumer payment device, and performing one or more fraud or security checks using the consumer profile data and account data if there is not an open fraud case associated with the consumer or with the consumer payment device.

In yet another embodiment, the present invention is directed to a non-transitory computer readable medium including instructions executable by a programmed processor, where the computer readable medium includes instructions for receiving a request for a consumer to be able to provide funds to a consumer payment device from an alternate source of funding, instructions for accessing consumer profile data and account data for the consumer payment device in response to receiving the request, instructions for determining if there is an open fraud case associated with the consumer or with the consumer payment device, instructions for denying the consumer's request if there is an open fraud case associated with the consumer or with the consumer payment device, and instructions for performing one or more fraud or security checks using the consumer profile data and account data if there is not an open fraud case associated with the consumer or with the consumer payment device.

Other objects and advantages of the present invention will be apparent to one of ordinary skill in the art upon review of the detailed description of the present invention and the included figures.

DETAILED DESCRIPTION

Figure 1:
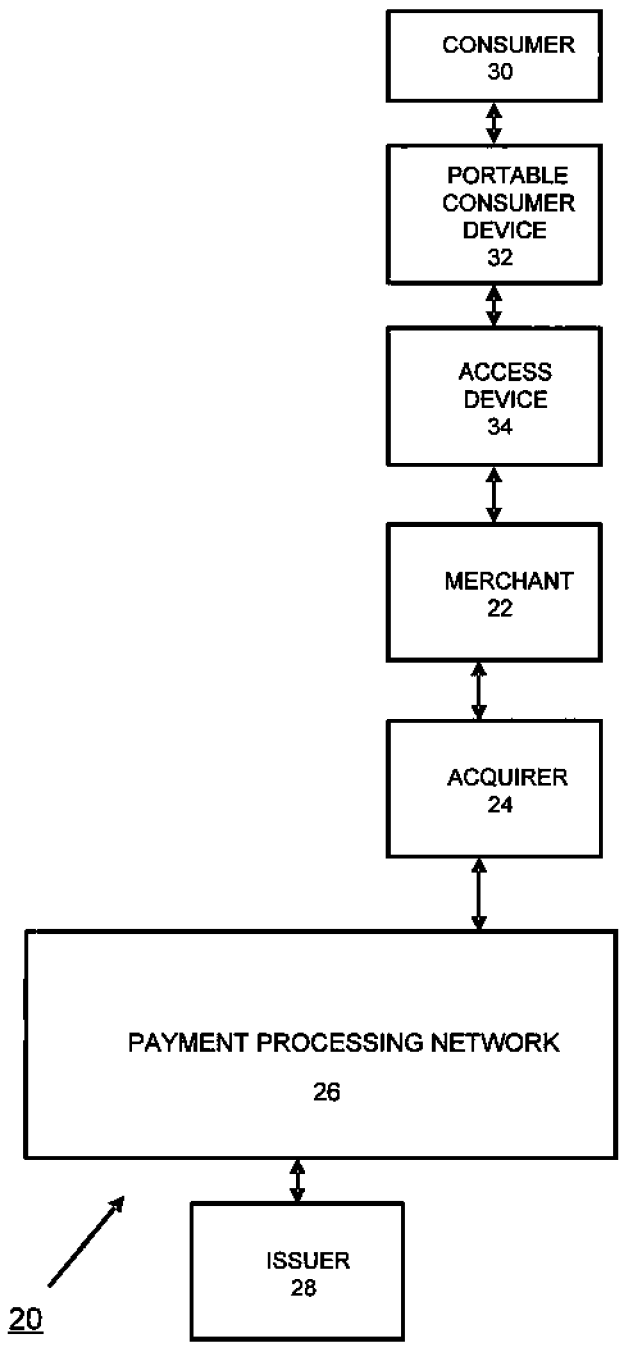
FIG. 1 is a diagram illustrating the primary functional elements of a system for conducting a payment transaction and processing payment transaction data that may be used in implementing some embodiments of the present invention.

Embodiments of the present invention are directed to a system, apparatuses, and methods for providing a means for a cardholder to load additional funds onto a prepaid card, such as a payroll card, by using a source of funding other than their employer. The invention permits a consumer or cardholder to request that an additional source of funding be authorized for their prepaid card, typically by submitting a request to a customer service representative of the card issuer or another entity that is responsible for administering the prepaid or payroll card system. The request may be made by using an interactive voice response (IVR) system, accessing a user interface at a web-site, or other suitable method. In response to receiving the request, the card issuer or an administrator of the prepaid card system indicates that the cardholder has submitted such a request in an appropriate file or data record. The issuer or administrator's action (or that of another suitable party) triggers the execution of one or more background, credit, or security type checks to determine if there are any unresolved fraud cases involving the cardholder, and to ensure that accurate data regarding the cardholder is available and that there are no indications that the request might be an attempt to commit a fraudulent act.

After the request from the cardholder to utilize an alternate funding source is received and processed, the payment processor, payment device issuer, or other data processing system accesses the cardholder account data or profile and determines if there are any open or unresolved fraud cases involving the cardholder account. If there are no such open cases, then the cardholder account is eligible for an alternate funding source qualification process. If there are one or more open fraud cases involving the cardholder account, then the request to utilize an alternate source of funding is denied and the account may be subject to closure.

If the cardholder account is eligible for the alternate funding source qualification process, then the process is initiated by conducting one or more background, credit, security, or fraud checks on the account and cardholder data. Such background, credit, security, or fraud checks may include determining if there is any personal information about the cardholder or information regarding the cardholder's previous financial transactions that would suggest fraudulent activity, or an unacceptable risk in approving the cardholder request to utilize an alternate source of funding. For example, the cardholder profile information (including the cardholder social security number) may be provided to one or more credit rating services, such as Experian. Such credit rating services typically evaluate the risk associated with a cardholder, account, or transaction by executing one or more fraud detection rules that use the cardholder or account data as inputs.

If one or more fraud detection rules are satisfied, then a fraud case file may be opened. An analyst may review the cardholder's fraud case file to make a judgment as to whether the triggering of the fraud rules is an indication that fraudulent activity is likely. If the fraud analyst determines that fraudulent activity is likely, then the account may be closed, thereby effectively denying the request for using an alternate source of funding. If the fraud analyst determines that no fraudulent activity is likely in the case of each satisfied fraud rule (or if no fraud detection rules were originally satisfied during the checking processes), then the cardholder's request to use an alternate source of funding for the prepaid card is approved. In this situation, the cardholder's profile or other data file will be updated to reflect the approval of the request for an alternate source of funding and the cardholder may be notified by email, voice message, or other suitable communications method.

The alternate source of funding may include any suitable source or multiple sources that are requested by the cardholder, including but not limited to, a fund loading network (such as the Visa ReadyLink network or the Green Dot network), a money transfer network (such as Western Union), or an account of the cardholder (such as a direct deposit account (DDA), or a transfer of credit from one account to another (an original credit transaction or OCT)). When a cardholder is determined to be eligible to utilize an alternate source of funding, the cardholder may be requested to input information regarding the account from which the funds will be obtained, such as an account number (e.g., the primary account number or PAN), or account security data (e.g., the Card Security Code (CSC) or Card Verification Value (CVV2)). This insures that the funding account is valid and belongs to the cardholder.

Although some embodiments of the invention will be described with reference to a cardholder and the use of the invention to provide an alternate source of funding for a prepaid or payroll card, it should be understood that the invention may be used by a consumer with any suitable consumer payment device. Such consumer payment devices include prepaid cards, payroll cards, a token that operates as a payment device, a contact or contactless chip incorporated in a card form factor or into a device such as a mobile phone, personal digital assistant or laptop computer, etc.

Embodiments of the present invention are typically implemented in the context of a payment transaction processing system, and specifically, in the context of a cardholder request to an issuer that is part of such a system. Therefore, prior to describing one or more embodiments of the invention in greater detail, a brief discussion of the entities involved in processing a payment transaction and their roles in the processing of payment transaction data, will be presented.

FIG. 1 is a diagram illustrating the primary functional elements of a system 20 for conducting a payment transaction and processing payment transaction data that may be used in implementing some embodiments of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "acquirer" is typically a business entity (e.g., a commercial bank) that has a business relationship with a particular merchant. An "issuer" is typically a business entity (e.g., a bank) which issues a payment device such as a credit card, debit card, smart card, or contactless device to a consumer. Some entities may perform both issuer and acquirer functions.

As shown in FIG. 1, in a typical transaction, a consumer 30 wishing to purchase a good or service from a merchant provides transaction data that may be used as part of a transaction authorization process, typically by means of a portable consumer device 32 that is capable of functioning as a payment device. Consumer 30 may utilize a portable payment device 32 such as a card having a magnetic strip encoded with account data or other relevant data (e.g., a prepaid card, payroll card, or standard credit or debit card) to initiate the transaction. In an E-Commerce (electronic commerce) transaction, the consumer may enter data into a consumer device capable of communicating with a merchant or other element of system 2, such as a laptop or personal computer. The consumer may also initiate the transaction using data stored in and provided from a suitable form of data storage device (such as a smart card, mobile phone or PDA containing a contactless element, or a transportable memory device). In some cases an access device 34 such as a point of sale terminal may be used to read, scan, or otherwise interact with a consumer's portable payment device and thereby obtain data used in conducting a payment transaction.

The payment account data (and if needed for processing the transaction, other consumer data) is obtained from the consumer's device and provided to the merchant 22 or to the merchant's data processing system. The merchant or merchant's data processing system generates a transaction authorization request message that may include data obtained from the consumer's payment device as well as other data related to the transaction and the merchant. The merchant transaction data processing system typically communicates with a merchant acquirer 24 (e.g., a commercial bank which manages the merchant's accounts) as part of the overall transaction authorization process. The merchant's transaction data processing system and/or merchant acquirer 24 provide data to Payment Processing Network 26, which among other functions, participates in the clearance and settlement processes which are part of the overall transaction processing. Payment Processing Network 26 communicates with issuer 28 as part of the authorization process, where issuer 28 is the entity that issued the payment device to the consumer and manages the consumer's account.

Payment Processing Network 26 may include data processing subsystems and networks, and be configured to implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for the transactions.

Payment Processing Network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. Payment Processing Network 26 may use any suitable wired or wireless network, including the Internet, to facilitate communications and data transfer between its component system elements.

Figure 2:
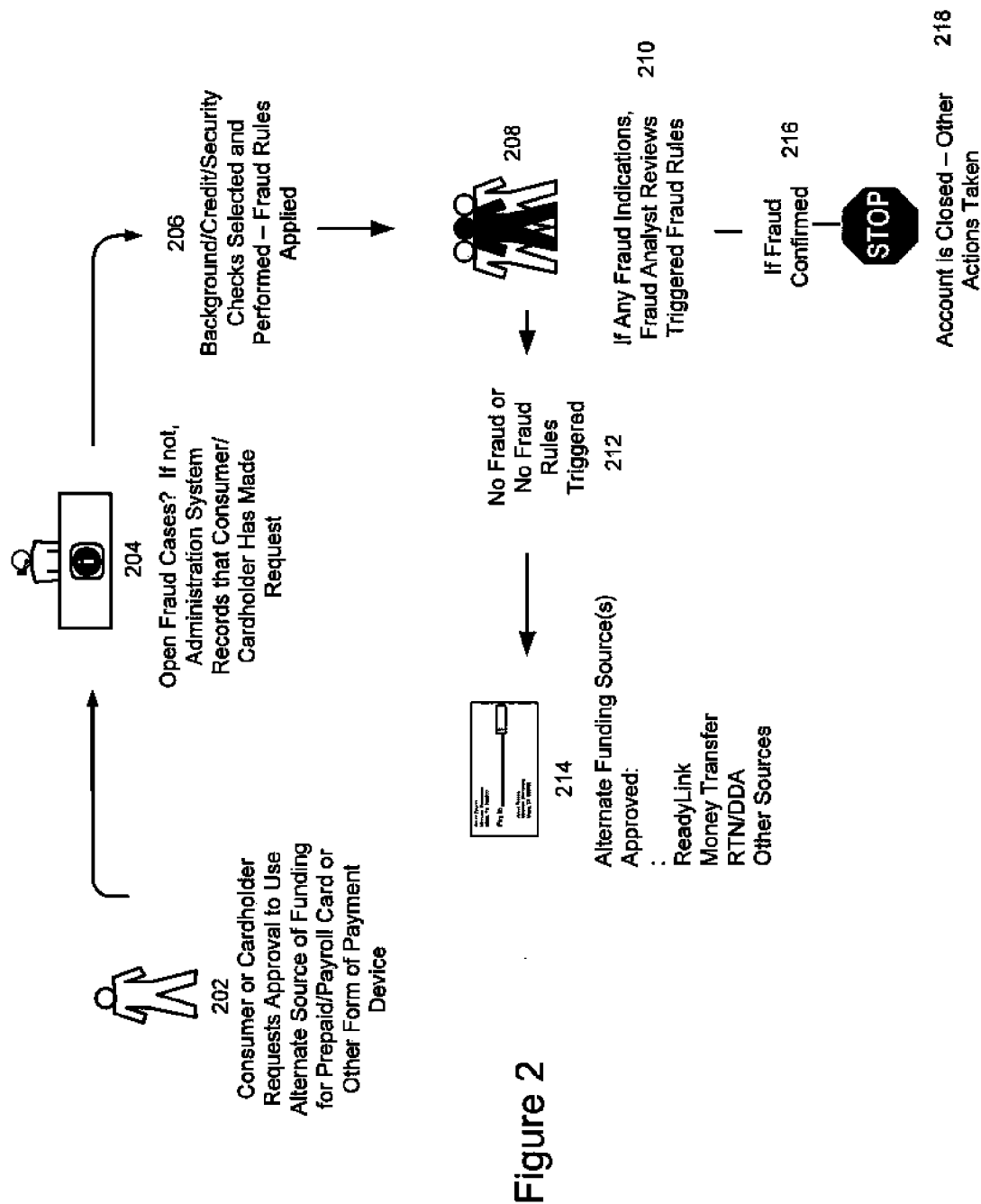
FIG. 2 is a block diagram illustrating the primary functional elements and operations of a system and associated method for providing an alternate source of funding to charge or load a prepaid card such as a payroll card, in accordance with some embodiments of the present invention.

FIG. 2 is a block diagram illustrating the primary functional elements and operations of a system and associated method for providing an alternate source of funding to charge or load a prepaid card such as a payroll card, in accordance with some embodiments of the present invention. As shown in the figure, in a typical embodiment, the inventive system and method include a consumer or cardholder 202, who is typically an employee of an employer who provides payment to the employee using a prepaid or payroll card. Consumer/Cardholder 202 makes a request for the use of an alternate source of funding (i.e., other than their employer) to be used to provide funds for the prepaid or payroll card (or other form of payment device). The request may be made to a customer service representative of the card issuer, the employer, or another entity responsible for administering the prepaid or payroll card system 204. The request may be made in person, over the phone, via email, via a user interface element on a web-site, or by another suitable method. In response to receiving the request, the customer service representative or administrator 204 of the prepaid or payroll card system may access the consumer/cardholder's profile or other account data and determine if there are any open or unresolved fraud cases involving the cardholder or account. If there are one or more open or unresolved fraud cases, then the request to utilize an alternate source of funding may be denied, and depending upon the policies of the issuer, the account may be closed.

If there are no open or unresolved fraud cases involving the consumer/cardholder or account, then the customer service representative or prepaid or payroll card system administrator 204 enters data into a file or record that indicates the consumer has requested the use of an alternative source of funding (and by implication, that there are no open or unresolved fraud cases involving the cardholder or account). Note that in some embodiments, the card issuer, employer, card system administrator, payment processing network, or another suitable entity may define or limit the acceptable sources of alternate funding, thereby limiting the sources that a consumer may obtain funding from for loading the card if the request is approved.

By making such an entry in the file or record for the consumer/cardholder, customer service representative or system administrator 204 triggers the execution of an alternate funding qualification process. The alternate funding qualification process may be defined by the card (or payment device) issuer or system administrator, but will typically include one or more background, credit, security, fraud, or other forms of checks or investigations 206. These checks or investigations may include collection and evaluation of background or personal data (such as social security number, addresses of previous residences, marital status, other names which the consumer/cardholder may have used in the past, etc.), performance of a credit check or collection of past credit history data, performance of a form of security check (e.g., court records, arrest records, office of foreign asset control investigation), evaluation of whether the request triggers one or more fraud detection rules (such as might be used in a transaction authorization or risk assessment process), or another suitable type of check or investigation. In some embodiments, performance of the checks or investigations may include providing consumer/cardholder profile information (e.g., including the social security number) to a fraud checking organization such as Experian.

One purpose of such checks or investigations is to ensure that accurate and up to date data concerning the consumer/cardholder is available and has been considered. Another purpose is to determine whether there are any indicators that might suggest that the request to provide an alternate source of funding is an attempt to commit fraud. For example, if the social security number provided by the consumer/cardholder is determined to have been issued to a person who is deceased or was born before the consumer/cardholder, then those would be indications of an attempt to commit fraud. Similarly, if the source of alternate funding being requested was found to be associated with a previous attempt to commit a fraudulent act or another type of irregularity, then that would suggest the possibility of fraud in the request to use that source of funding. In some embodiments, a set of fraud detection rules or heuristics is used to determine if a set of facts suggests the possibility of an attempt to commit fraud. If one or more of the fraud detection rules or heuristics is satisfied, then a fraud analyst 208 may be asked to examine the case file and evaluate the likelihood that the request by the consumer/cardholder represents an attempt to commit a fraudulent act.

As mentioned, after the desired background, credit, security, fraud or other type of checks or investigations are selected and performed, the results may be reviewed by a fraud analyst 208. If no fraud detection rules are satisfied or triggered 212, then the use of an alternate source of funding is approved 214 and the consumer/cardholder may take whatever additional steps are required to provide funds to the prepaid or payroll card (or other form of payment device) from the alternate source or sources. Such alternate source or sources may include, but are not limited to, a fund loading network (such as the Visa ReadyLink network or the Green Dot network), a money transfer network (such as Western Union), or an account of the cardholder (such as a direct deposit account (DDA), or a transfer of credit from one consumer account to another (OCT)). As mentioned, in some embodiments, the type or characteristics of the alternate source of funding may be limited or otherwise subjected to restrictions by the issuer or administrator of the prepaid or payroll card system.

If one or more of the fraud detection rules are satisfied (or triggered) 210, then a fraud analyst may be requested to examine the case file and perform whatever additional investigations or analyses are indicated in order to determine whether the request for an alternate source of funding represents an attempt to commit fraud. If the analyst concludes that fraud is confirmed or likely 216, then the request is denied, and the account may be closed 218 (thereby preventing the consumer/cardholder from using the card), or in the alternative, limitations may be placed on the card, payment device or account. If the analyst concludes that fraud is not likely 212, then the request is approved and the consumer/cardholder may take whatever additional steps are required to provide funds to the prepaid or payroll card from the alternate source or sources.

Figure 3:
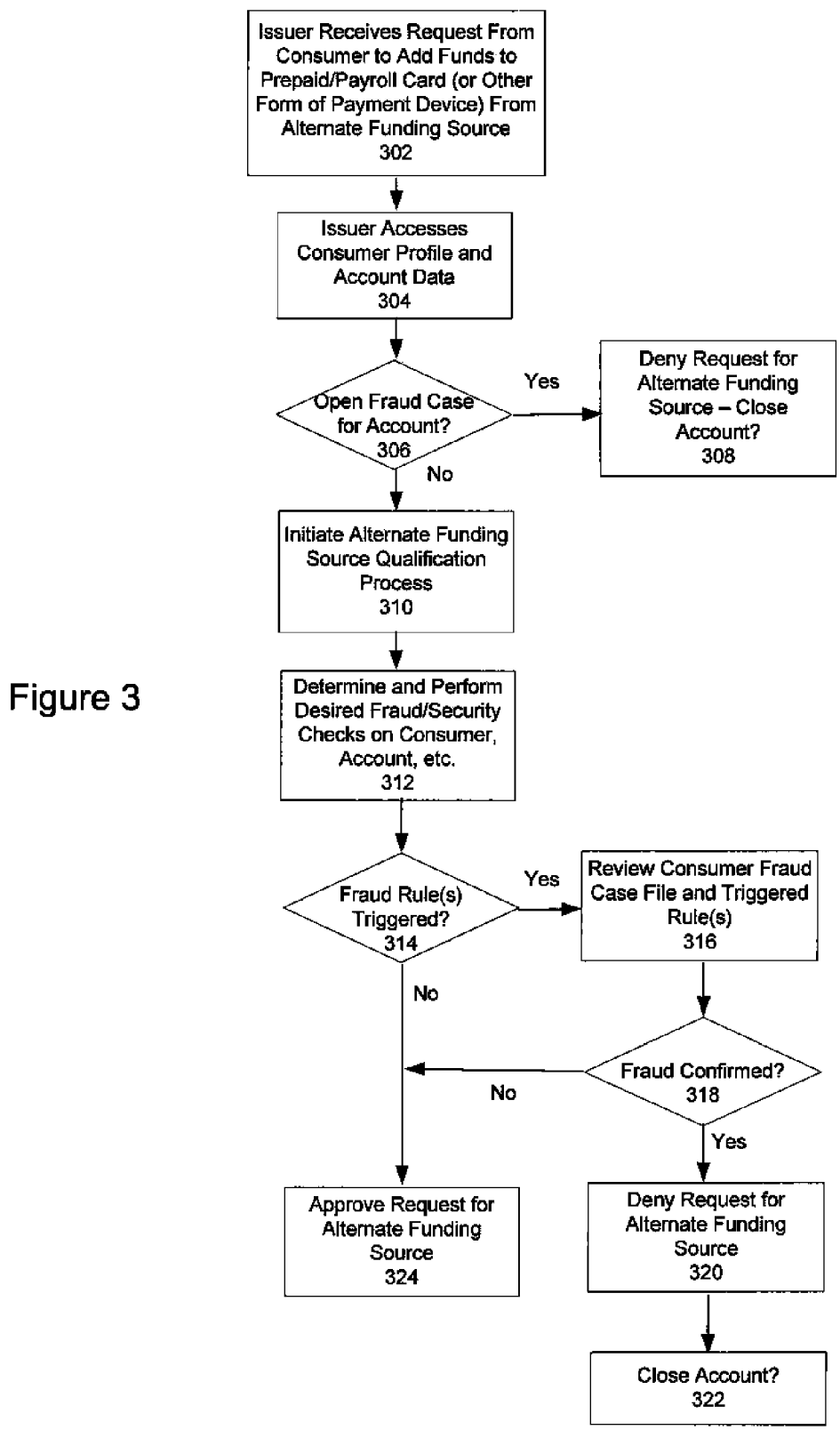
FIG. 3 is a flowchart illustrating a process for providing an alternate source of funding to charge or load a prepaid card such as a payroll card, in accordance with some embodiment flowchart illustrating a process by which a consumer who uses a prepaid or payroll cs of the present invention.

FIG. 3 is a flowchart illustrating a process for providing an alternate source of funding to charge or load a prepaid card such as a payroll card, in accordance with some embodiments of the present invention. As shown in the figure, the inventive process may begin with a consumer who uses a prepaid or payroll card (or other form of payment device) requesting a customer service representative of an issuer of the card or a system administrator for a payroll card program (which may be a function provided by the employer) to add funds to their prepaid or payroll card from an alternate source of funding (e.g., an entity other than their employer) (stage 302). In response, the customer service representative or system administrator accesses the consumer's profile and account data (stage 304). The consumer's profile and account data may include information related to the consumer's identification (such as a social security number), account history for the prepaid or payroll card, transaction history for the card, etc.

The customer service representative or system administrator then determines if the consumer account is associated with any open or unresolved fraud cases (stage 306). If the consumer account is associated with an open or unresolved fraud case (corresponding to the "Yes" branch of stage 306), then the consumer request for use of an alternate source of funding is denied and the account may be closed (stage 308). If the consumer account is not associated with an open or unresolved fraud case (corresponding to the "No" branch of stage 306), then the customer service representative or system administrator initiates an alternate funding source qualification process (stage 310). The qualification process will perform one or more fraud or security checks on the consumer and consumer account (i.e., the payment account associated with the card or other payment device) as part of determining whether to approve or deny the request by the consumer to use an alternate source of funding for their prepaid or payroll card (or other form of payment device).

At stage 312, the customer service representative or system administrator determines which types of fraud or security checks or investigations to perform on the consumer or consumer account, and initiates the execution of those checks or investigations. Such checks or investigations may include any relevant or appropriate background, credit, security, or fraud checks, and may involve collection and evaluation of personal data about the consumer, data about the financial situation of the consumer, data about the requested alternate source or sources of funding, etc. The checks or investigations may include determining if there is any personal information about the consumer or information regarding the consumer's previous financial transactions that would suggest fraudulent activity or the presence of an unacceptable risk in approving the consumer request to utilize an alternate source of funding. For example, the consumer profile information (including the consumer's social security number) may be provided to one or more credit rating services, such as Experian. Such credit rating services typically evaluate the risk associated with a consumer, account, or transaction by executing one or more fraud or risk assessment rules that use the consumer or account data as inputs (stage 314).

If one or more fraud detection rules are satisfied or triggered (corresponding to the "Yes" branch of stage 314), then a fraud case file may be opened. An analyst may review the consumers fraud case file and the triggered fraud rules (stage 316) to make a judgment as to whether fraudulent activity is likely. If the fraud analyst determines that fraudulent activity is likely (corresponding to the "Yes" branch of stage 318), then the account may be closed, thereby effectively denying the request for using an alternate source of funding (stages 320 and 322). If the fraud analyst determines that no fraudulent activity is likely in the case of any satisfied fraud rules (corresponding to the "No" branch of stage 318), or if no fraud detection rules were originally satisfied during the evaluation of the fraud rules (corresponding to the "No" branch of stage 314), then the consumers request to use an alternate source of funding for the prepaid card is approved (stage 324). In this situation, the consumers profile or other data file will be updated to reflect the approval of the request for an alternate source of funding and the consumer may be notified by email, voice message, or other suitable communications method. The alternate source of funding may include any suitable source or multiple sources that are requested by the consumer, including but not limited to, a fund loading network (such as the Visa ReadyLink network or the Green Dot network), a money transfer network (such as Western Union), or an account of the consumer (such as a direct deposit account (DDA), or a transfer of credit from one account to another (OCT)). As mentioned, the type or character of the approved alternate source or sources of funding may be subject to limitations or restrictions imposed by the card issuer or the system administrator for the prepaid or payroll card program, so that in some cases not all of the possible alternate sources of funding may be available to the consumer.

Figure 4:
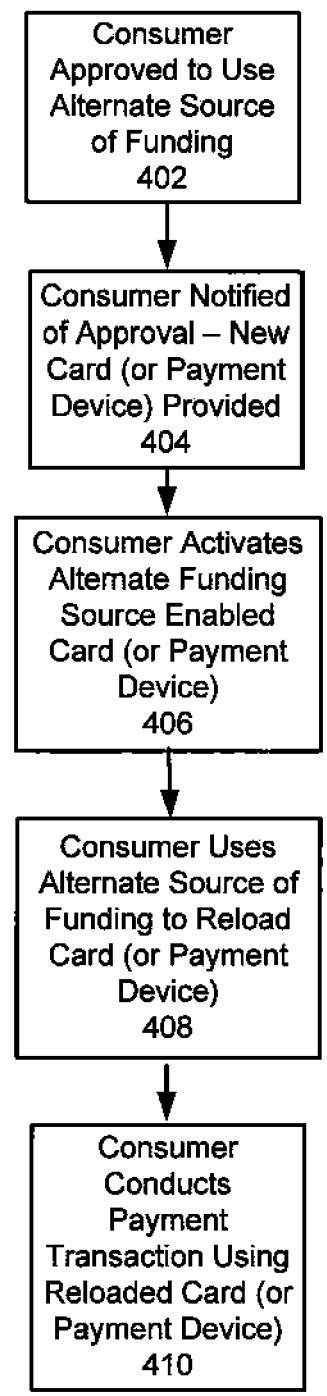
FIG. 4 is a fard is approved for use of an alternate source of funding for their card, and enabled to reload their card and to use the reloaded card to conduct a payment transaction, in accordance with some embodiments of the present invention.

FIG. 4 is a flowchart illustrating a process by which a consumer who uses a prepaid or payroll card is approved for use of an alternate source of funding for their card, and enabled to reload their card and to use the reloaded card to conduct a payment transaction, in accordance with some embodiments of the present invention. As shown in the figure, the process of FIG. 4 is initiated after a consumer is approved to use an alternate source of funding to reload their card (or other form of payment device) (stage 402), for example as a result of the process depicted in FIG. 3. After the approval, the consumer is notified of the approval to use an alternate source of funding and a new card (or payment device) is provided to the consumer (stage 404). The new card (or payment device) is configured to permit the approved alternate source or sources of funding and may include a unique identifier or other data that indicates that the account has been approved to use an alternate source of funding, and identifies which funding sources have been approved for use to reload the card or payment device.

The consumer then activates the new card or payment device (stage 406). The activation process may be the same as one used for cards or payment devices that do not permit the use of an alternate source of funding, or the activation process may be specific to cards or payment devices that are approved to use an alternate source of funding. Activation may involve the consumer accessing a web-site provided by the card or payment device issuer or system administrator to provide identification, account, or security data, accessing an interactive voice response (IVR) system to provide one or more inputs requested by the system, or contacting a customer service representative to request activation of the card or payment device. When the card or payment device that is approved to use an alternate source of funding is activated, the previous card or payment device that was not capable of being reloaded using an alternate source of funding may be designated as inactive or closed. In the case of a payment device that is incorporated into another device, such as a mobile phone, payment account data, payment device registration or identification data, or other relevant data may be changed to reflect that the status of the payment device or payment account has changed.

After activation, the consumer may then reload or recharge their card or payment device using one or more of the approved alternate sources of funding. This may involve accessing a web-site associated with, or contacting a representative of, a fund loading network (such as the Visa ReadyLink network or the Green Dot network), a money transfer network (such as Western Union), or a banking institution that manages an account of the consumer (such as a direct deposit account (DDA) or checking account) (stage 408). The reload or recharging operation may involve a transfer of funds from one consumer account to the card or payment device, or the crediting of funds supplied by another person to the card or payment device. After the alternate source of funding approved card or payment device is reloaded or recharged with funds, the consumer may conduct a payment transaction using the reloaded card or payment device (stage 410).

In some embodiments, the inventive methods, processes or operations for providing a mechanism for loading a prepaid card, such as a payroll card, with funds from a source other than the employer of the consumer or cardholder may be wholly or partially implemented in the form of a set of instructions executed by a programmed central processing unit (CPU) or microprocessor. The CPU or microprocessor may be incorporated in an apparatus, server or other computing device. The apparatus, server or other computing device may be operated by the consumer's employer, a system administrator for the employer's payroll card program, the card or payment device issuer (element 28 of FIG. 1), an element of a payment processing network (element 26 of FIG. 1), or other suitable entity.

Figure 5:
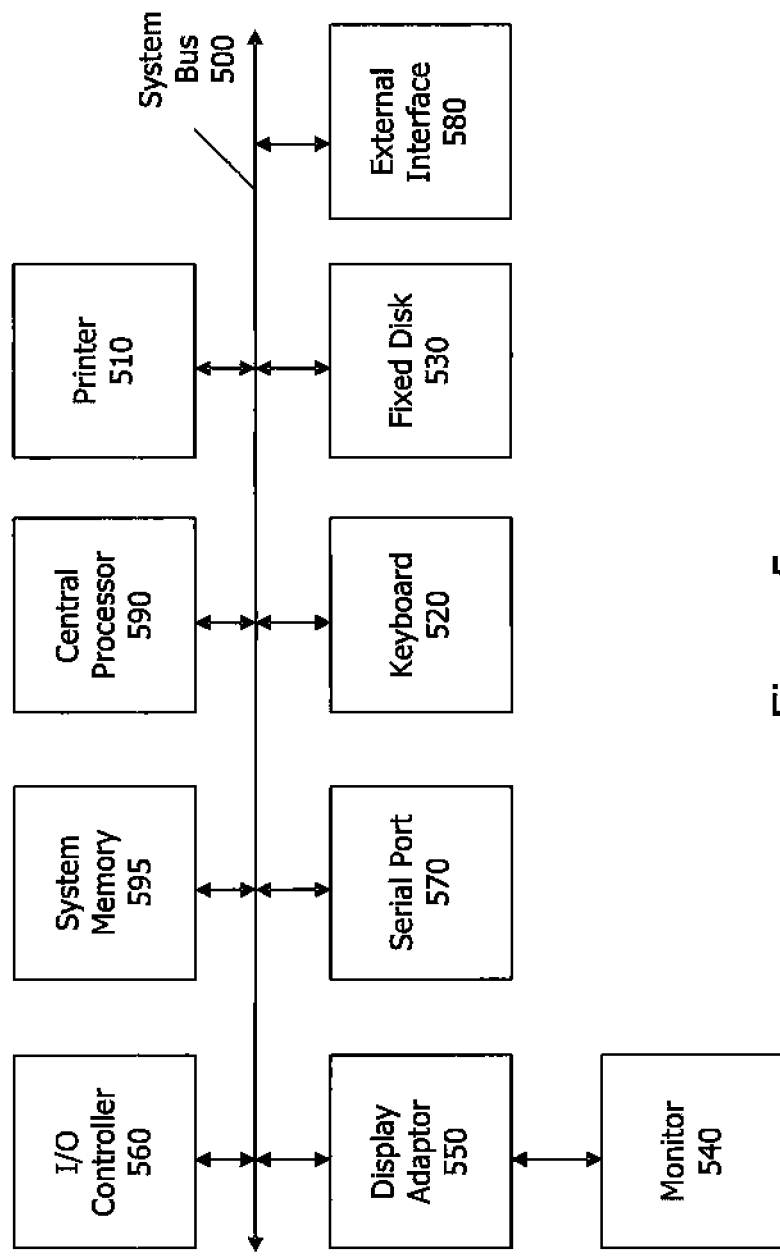
FIG. 5 is a block diagram of elements that may be present in a computer device or system configured to execute a method or process for providing an alternate source of funding to charge or load a prepaid card such as a payroll card, in accordance with some embodiments of the present invention.

As an example, FIG. 5 is a block diagram of elements that may be present in a computer device or system configured to execute a method or process for providing an alternate source of funding to charge or load a prepaid card such as a payroll card, in accordance with some embodiments of the present invention. The subsystems shown in FIG. 5 are interconnected via a system bus 500. Additional subsystems such as a printer 510, a keyboard 520, a fixed disk 530, a monitor 540, which is coupled to a display adapter 550, and others are shown. Peripherals and input/output (I/O) devices, which couple to an I/O controller 560, can be connected to the computer system by any number of means known in the art, such as a serial port 570. For example, the serial port 570 or an external interface 580 can be used to connect the computer apparatus to a wide area network such as the Internet, a mouse input device, or a scanner. The interconnection via the system bus 500 allows a central processor 590 to communicate with each subsystem and to control the execution of instructions that may be stored in a system memory 595 or the fixed disk 530, as well as the exchange of information between subsystems. The system memory 595 and/or the fixed disk 530 may embody a computer readable medium.

Embodiments of the invention allow a consumer or cardholder who uses a prepaid or payroll card (or a consumer in possession of a different form of payment device) to use a source other than their employer (or, if the card or payment device was not issued by their employer, other than the entity that originally loaded the card or other form of payment device) to provide funds that may be accessed using the card or payment device. Typically, a consumer's prepaid or payroll card (or other form of payment device) is prevented from being reloaded by any entity other than the consumer's employer (or another entity responsible for the initial transfer of funds to the card or payment device) until the consumer has requested that their account be qualified to receive funds from an alternate source of funding and the account has been properly qualified. After the proper qualification of the account and reloading of the card or payment device, the consumer is enabled to use the card or payment device to conduct payment transactions in situations in which they might otherwise be unable to conduct the transaction, such as while they are waiting for their next paycheck but find themselves in need of funds to purchase a product or service.

Embodiments of the invention may be used to provide a mechanism for the funding of a prepaid account using a variety of sources, including, but not limited to, a card loading network, money transfers, a consumer's checking account, etc. Although the inventive systems, apparatuses, and methods have been described with reference to qualifying a primary consumer/cardholder's card, the invention may also be used to qualify a secondary or joint cardholder associated with the same account to be able to reload a prepaid or payroll card with funding from an alternative source of funds. In such a case, the secondary or joint cardholder's profile and account data may also be subjected to the fraud or security checks or investigations described with reference to the primary cardholder. Further, in the case in which a consumer/cardholder is qualified to use one or more alternate sources of funding, an issuer or card (or payment device) system administrator may issue the consumer/cardholder an alternate funding upgrade card or payment device that enables the consumer/cardholder to utilize specific alternate sources of funding, or specific functionality of an alternate source of funding.

If desired, an issuer or card (or payment device) system administrator may generate a report that contains data concerning the consumers/cardholders who have requested approval for use of an alternate source of funding. The report may also indicate the status of the alternate funding source qualification process for each requesting consumer/cardholder, including whether there are any open or unresolved fraud cases involving the consumer/cardholder, whether any fraud or risk assessment rules have been triggered for the consumer/cardholder, and statistics regarding the number of requests received for approval of the use of an alternate source of funding. Further, as noted, an issuer, payroll card system administrator, payment processing system or network element, or other relevant entity may place limits or restrictions on the type of alternate sources they will allow if the consumer/cardholder is approved to use an alternate source of funding to load their prepaid or payroll card (or other form of payment device).

As noted, although some embodiments of the invention have been described with reference to a cardholder and the use of the invention to provide an alternate source of funding for a prepaid or payroll card, it should be understood that the invention may be used by a consumer with any suitable consumer payment device. Such consumer payment devices include prepaid cards, payroll cards, a token that operates as a payment device, a contact or contactless chip incorporated in a card form factor or into a device such as a consumer's mobile phone, personal digital assistant or laptop computer, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for enabling a consumer to load funds to a consumer payment device, comprising:
   an electronic processor programmed to execute a set of instructions;
   a data storage device coupled to the processor; and
   the set of instructions contained in the data storage device, wherein when the set of instructions are executed by the processor, the apparatus enables the consumer to load funds to the consumer payment device by:
   preventing the consumer payment device from being reloaded by an entity other than an original funding source;

receiving a request for the consumer to be able to provide funds to the consumer payment device from an alternate source of funding from the original funding source;

accessing consumer profile data and account data for the consumer payment device in response to receiving the request;

verifying that the consumer payment device is eligible for funding from the alternate source of funding;

determining if there is an open fraud case associated with the consumer or with the consumer payment device after verifying that the consumer payment device is eligible for funding from the alternate source of funding;

denying the consumer's request if there is an open fraud case associated with the consumer or with the consumer payment device;

performing one or more fraud or security checks using the consumer profile data and account data if there is not an open fraud case associated with the consumer or with the consumer payment device; and enabling a loading of funds to the consumer payment device.

2. The apparatus of claim 1, wherein performing the one or more fraud or security checks further comprises:

approving the request from the consumer if performance of the one or more fraud or security checks does not indicate the possibility of fraud;

reviewing the results of the outcome of the one or more fraud or security checks if performance of the one or more fraud or security checks indicates the possibility of fraud;

denying the request from the consumer if review of the results of the outcome of the one or more fraud or security checks indicates fraud; and approving the request from the consumer if review of the results of the outcome of the one or more fraud or security checks does not indicate fraud.

3. The apparatus of claim 2, wherein performing the one or more fraud or security checks further comprises closing the account associated with the consumer payment device if the request from the consumer to provide funds to the device from the alternate source of funding is denied.

4. The apparatus of claim 1, wherein the request is made to an issuer of the consumer payment device and provided to an element of a payment processing network.

5. The apparatus of claim 1, wherein performing one or more fraud or security checks using the consumer profile data and account data further comprises performing a credit fraud analysis of the consumer and the account associated with the consumer payment device.

6. The apparatus of claim 5, wherein performing a credit fraud analysis of the consumer and the account associated with the consumer payment device further comprises determining whether one or more fraud detection rules is triggered by data regarding the consumer or the account associated with the consumer payment device.

7. The apparatus of claim 1, wherein the alternate source of funding is one or more of a money transfer network, a checking account of the consumer, a savings account of the consumer, a credit account of the consumer, or a fund loading network.

8. The apparatus of claim 1, wherein the one or more fraud or security checks performed include one or more of a credit check, a background check on the consumer based on the consumer's social security number, or a check for possible fraudulent activity associated with the consumer.

9. The apparatus of claim 1, wherein the consumer payment device is a prepaid card or a payroll card.

10. The apparatus of claim 1, wherein the apparatus further enables the consumer to load funds to the consumer payment device by:

subsequent to denying the request for the consumer to be able to provide funds to the consumer payment device from the alternate source, loading the consumer payment device from the original funding source.

11. A method for enabling a consumer to load funds to a consumer payment device, comprising:

preventing the consumer payment device from being reloaded by an entity other than an original source of funding;

receiving, at a computer device, a request for the consumer to be able to provide funds to the consumer payment device from an alternate source of funding from the original source of funding;

accessing consumer profile data and account data for the consumer payment device in response to receiving the request;

verifying that the consumer payment device is eligible for funding from the alternate source of funding;

determining if there is an open fraud case associated with the consumer or with the consumer payment device;

denying the consumer's request if there is an open fraud case associated with the consumer or with the consumer payment device;

performing one or more fraud or security checks using the consumer profile data and account data if there is not an open fraud case associated with the consumer or with the consumer payment device; and enabling a loading of funds to the consumer payment device.

12. The method of claim 11, further comprising:

approving the request from the consumer if performance of the one or more fraud or security checks does not indicate the possibility of fraud;

reviewing the results of the outcome of the one or more fraud or security checks if performance of the one or more fraud or security checks indicates the possibility of fraud;

denying the request from the consumer if review of the results of the outcome of the one or more fraud or security checks indicates fraud; and approving the request from the consumer if review of the results of the outcome of the one or more fraud or security checks does not indicate fraud.

13. The method of claim 11, wherein the request is made to an issuer of the consumer payment device and provided to an element of a payment processing network.

14. The method of claim 11, wherein performing one or more fraud or security checks using the consumer profile data and account data further comprises performing a credit fraud analysis of the consumer and the account associated with the consumer payment device.

15. The method of claim 14, wherein performing a credit fraud analysis of the consumer and the account associated with the consumer payment device further comprises determining whether one or more fraud detection rules is triggered by data regarding the consumer or the account associated with the consumer payment device.

16. The method of claim 11, wherein the alternate source of funding is one or more of a money transfer network, a checking account of the consumer, a savings account of the consumer, a credit account of the consumer, or a fund loading network.

17. The method of claim 11, wherein the one or more fraud or security checks performed include one or more of a credit check, a background check on the consumer based on the consumer's social security number, or a check for possible fraudulent activity associated with the consumer.

18. The method of claim 11, wherein performing the one or more fraud or security checks further comprises closing the account associated with the consumer payment device if the request from the consumer to provide funds to the device from the alternate source of funding is denied.

19. The method of claim 11, wherein the consumer payment device is a prepaid card or a payroll card.

20. The method of claim 11, further comprising:
loading funds to the consumer payment device from the original source of funding after denying the consumer's request for funding from the alternate source of funding when there is an open fraud case.

21. The method of claim 20, further comprising generating a report that contains data concerning requests for approval for use of the alternate source of funding; a status of a qualification process for the alternate source of funding; and statistics regarding a number of requests received for approval of use of the alternate source of funding.

22. A non-transitory machine-readable storage medium encoded with a computer program code, such that, when the computer program code is executed by one or more processors, the one or more processors perform a method comprising:

preventing a consumer payment device from being reloaded by an alternate source of funding other than an original source of funding receiving a request for a consumer to be able to provide funds to the consumer payment device from the alternate source of funding;

accessing consumer profile data and account data for the consumer payment device in response to receiving the request;

verifying that the consumer payment device is eligible for funding from the alternate source of funding;

determining if there is an open fraud case associated with the consumer or with the consumer payment device;

determining if there is an open fraud case associated with the alternate source of funding;

denying the consumer's request if there is an open fraud case associated with the consumer, the alternate source of funding, or with the consumer payment device; and performing one or more fraud or security checks using the consumer profile data and account data if there is not an open fraud case associated with the consumer or with the consumer payment device;

wherein the one or more processors are associated with the original source of funding.

* * * * *